US011353617B1

(12) United States Patent
Fouda et al.

(10) Patent No.: US 11,353,617 B1
(45) Date of Patent: Jun. 7, 2022

(54) DEEP LEARNING METHODS FOR WELLBORE LEAK DETECTION (71) Applicant: Halliburton Energy Services, Inc., Houston, TX (US)

(72) Inventors: Ahmed Elsayed Fouda, Spring, TX (US); Junwen Dai, The Woodlands, TX (US); Li Pan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/114,753

(22) Filed: Dec. 8, 2020

(51) Int. Cl.
G01V 1/50 (2006.01)
E21B 47/002 (2012.01)
E21B 47/107 (2012.01)
G01M 3/24 (2006.01)

(52) U.S. Cl.
CPC ............ G01V 1/50 (2013.01); E21B 47/0025 (2020.05); E21B 47/107 (2020.05); G01M 3/246 (2013.01)

(58) Field of Classification Search
CPC ..... G01V 1/50; E21B 47/107; E21B 47/0025; G01M 3/246
See application file for complete search history.

(56) References Cited

U.S. PATENT DOCUMENTS

| 6,102,617 | A | * | 8/2000 | Hampton | G01M 3/005 405/129.5 |
| 7,960,969 | B2 | | 6/2011 | Mouget et al. | |
| 9,714,566 | B2 | | 7/2017 | Mandal | |
| 9,715,034 | B2 | | 7/2017 | Omeragic et al. | |
| 9,983,173 | B2 | | 5/2018 | Aslanyan et al. | |
| 10,359,525 | B2 | | 7/2019 | Jagannathan et al. | |
| 10,392,925 | B2 | | 8/2019 | Ang et al. | |
| 10,502,044 | B2 | | 12/2019 | Fouda et al. | |
| 10,520,626 | B2 | * | 12/2019 | Ang | E21B 47/107 |
| 10,760,410 | B2 | | 9/2020 | Nguyen et al. | |
| 11,162,353 | B2 | * | 11/2021 | Thiruvenkatanathan | E21B 47/135 |
| 2002/0029883 | A1 | | 3/2002 | Vinegar et al. | |
| 2015/0198733 | A1 | * | 7/2015 | Lie | E21B 47/107 367/35 |

(Continued)

FOREIGN PATENT DOCUMENTS

WO 2019139639 A1 7/2019

OTHER PUBLICATIONS

"Acoustic Conformance Xaminer® (ACX™) Service", Halliburton Energy Services, Wireline & Perforating, 2016, 2 pages.

(Continued)

Primary Examiner — Albert K Wong
(74) Attorney, Agent, or Firm — Delizio, Peacock, Lewin & Guerra (57) ABSTRACT Methods and systems for leak detection are provided herein. A method for leak detection can comprise conveying an acoustic leak detection tool inside the innermost tubular of the multiple nested tubulars; taking measurements of the multiple nested tubulars at multiple measurement depths with the acoustic leak detection tool; arranging the measurements into a response image; and feeding the response image to a pre-trained deep neural network (DNN) to produce a flow likelihood image, wherein the DNN comprises at least one convolutional layer, and wherein the flow likelihood image comprises a representation of one or more flow patterns in at least one annulus formed by the multiple nested tubulars.

20 Claims, 8 Drawing Sheets

(56) References Cited

U.S. PATENT DOCUMENTS

| | | | |
|---|---|---|---|
| 2017/0275987 | A1 | 9/2017 | Al-Hussain et al. |
| 2017/0350234 | A1 | 12/2017 | Xia et al. |
| 2017/0350235 | A1 | 12/2017 | Christofi et al. |
| 2018/0010443 | A1 | 1/2018 | Lu et al. |
| 2018/0106763 | A1 | 4/2018 | Fouda et al. |
| 2018/0274359 | A1 | 9/2018 | Bondarenko et al. |
| 2018/0371897 | A1 | 12/2018 | Ang et al. |
| 2019/0203585 | A1 | 7/2019 | Nguyen et al. |
| 2020/0174149 | A1* | 6/2020 | Thiruvenkatanathan ............... G06F 30/28 |
| 2020/0271803 | A1 | 8/2020 | Ang et al. |
| 2020/0271808 | A1 | 8/2020 | Jagannathan |
| 2020/0292728 | A1 | 9/2020 | Ang et al. |

OTHER PUBLICATIONS

"Acoustic Conformance Xaminer® (ACX™) Tool Identifies Low-Rate Gas Leak in Production Casing", Halliburton Case Study, 2016, 2 pages.

Brill, "Electromagnetic Casing Inspection Tool for Corrosion Evaluation", International Petroleum Technology Conference, 2011, 14 pages.

Brownlee, "A Gentle Introduction to k-fold Cross-Validation", Machine Learning Mastery, Retrieved from the Internet <URL: https://machinelearningmastery.com/k-fold-cross-validation/>, 2018, 8 Pages.

Buduma, et al., "Fundamentals of Deep Learning Designing Next-Generation Machine Intelligence Algorithms", O'Reilly Media; 1st edition (Jul. 4, 2017), 288 pages.

Dutta, et al., "Analysis and Interpretation of Multi-Barrier Transient Electromagnetic Measurements", SPWLA 61st Annual Logging Symposium, 2020, 13 pages.

Rourke, et al., "Multi-Tubular Corrosion Inspection Using a Pulsed Eddy Current Logging Tool", International Petroleum Technology Conference, 2013, 6 pages.

San Martin, et al., "New High-Definition Frequency Tool for Tubing and Multiple Casing Corrosion Detection", Society of Petroleum Engineers, 2017, 14 pages.

PCT Application No. PCT/US2020/064428, International Search Report, dated Aug. 12, 2021, 6 pages.

PCT Application No. PCT/US2020/064428, Written Opinion, dated Aug. 12, 2021, 5 pages.

* cited by examiner

FIG. 8

DEEP LEARNING METHODS FOR WELLBORE LEAK DETECTION

TECHNICAL FIELD

The disclosure generally relates to the field of surveying boreholes (i.e. wellbores), and particularly inspecting tubulars disposed therein.

BACKGROUND

Most, if not all, oil and gas wells, one or more tubulars are disposed in a wellbore of the well. In many instances, multiple tubulars are nested circumferentially, i.e. with smaller diameter tubulars disposed within larger diameter wellbores. Over time these tubulars can experience leakage due to many causes, including electrochemical, chemical, or mechanical origins. Early detection of leaks due can be very valuable to oil and gas wells management, as failure detection of the leaks may lead to expensive remedial measurements and intervention in production wells.

BRIEF DESCRIPTION OF THE DRAWINGS

Embodiments of the disclosure may be better understood by referencing the accompanying drawings.

DESCRIPTION

The following detailed description refers to the accompanying drawings that show, by way of illustration and not limitation, various embodiments. These embodiments are described in sufficient detail to enable those skilled in the art to practice these and other embodiments. Other embodiments may be utilized, and structural, mechanical, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

The present disclosure describes methods and apparatus for accurately identifying and locating leaks in one or more tubulars that appear as acoustic sources within and around a wellbore such that a radial distance associated with an acoustic source, such as a fluid leak, from a center axis of the borehole can be more accurately identified. Fluid leaks such as water leaks, oil leaks or other flow of fluid caused by cracks in the earth or other issues can cause damage to the wellbore and reduce its effectiveness. Leaks or other damage to the wellbore, tubulars, or casing can cause unwanted or hazardous accumulation or flow to other zones. Therefore, the detection of such leaks in and around the wellbore can result in increased efficiency and provide for enhanced safety in construction of the well.

A fluid leak can naturally produce sound such as acoustic noise, and accordingly can be treated as an acoustic source. The movement of earth, fluid, or any material in and around the wellbore can be an event which produces sound, and thus can serve as an acoustic source. Accordingly, although fluid leaks and the like may serve as an acoustic source, acoustic sources are not limited to these but can be anything which produces sound such as acoustic noise. An acoustic source may comprise a source of pressure waves detectable within and around the wellbore, including but not limited to fluid leaks or the movement of earth or other material within a casing, within or around the cement disposed in the wellbore, as well as the area surrounding the wellbore.

Accordingly, the present disclosure provides methods, systems, and a computer-readable media for determining a location of an acoustic source such as a fluid leak to determine what is occurring within and around a wellbore, including what is occurring in an annulus or behind a casing where applicable. As used herein, behind a casing refers to an acoustical source that is located on the same side of the casing as the formation with the tool located on the other side of the casing.

An acoustic leak detection tool can be deployed in in one or more tubulars, the tool having an array of acoustic sensors for receiving acoustic signals from an acoustic source, and can include an azimuthal sensor array and/or a vertical sensor array. Some acoustic leak detection tools may include transmitters for additional logging operations, but the determination and characterization of a downhole acoustic source may be accomplished without transmitting an acoustic signal from the tool.

The raw measurements of the acoustic signal can be arranged into a response image representative of a tool response to one or more leakage paths in the one or more tubulars. The response image can be fed directly to a pre-trained deep neural network (DNN) having at least one convolutional layer to produce a flow likelihood image that can be used to identify leaks, thereby avoiding time consuming processing and potentially avoiding relying on as many assumptions (e.g. assumptions regarding physical properties of the tubulars like thickness, density, etc. or even assuming physical dimensions of the tubulars) or other measurements (e.g. pressure, temperature, etc.). By pre-training a DNN having at least one convolutional layer, the DNN can rapidly provide an accurate flow likelihood map. Further, the accuracy of the DNN can continue to be enhanced with further training thereof by adding real data to the training database.

Figure 1:
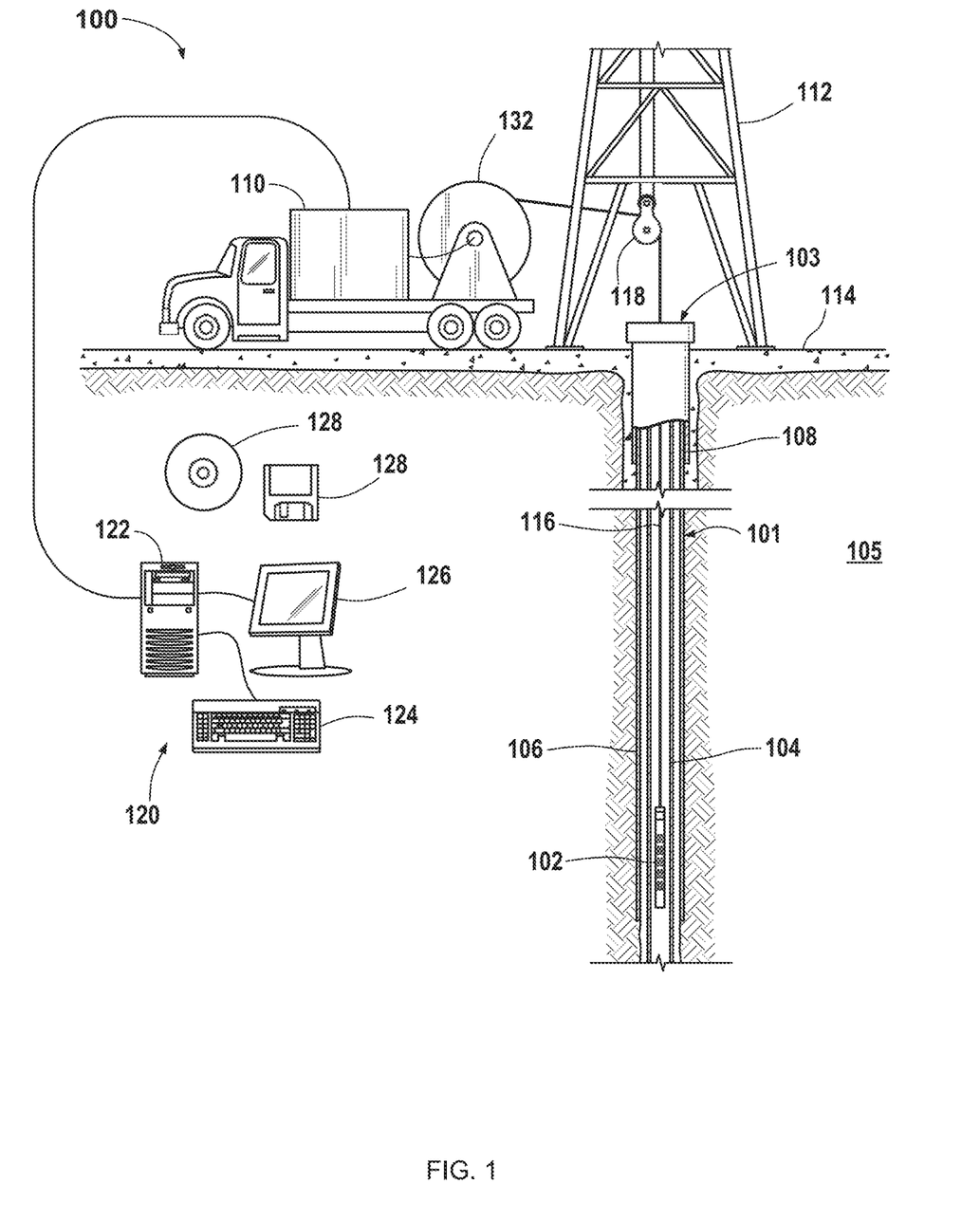
FIG. 1 depicts a schematic diagram of a well measurement system, according to one or more embodiments.

FIG. 1 depicts a schematic diagram of a well measurement system 100, according to one or more embodiments. In one or more embodiments, the well measurement system can be or include an acoustic leak detection system. However, the well measurement system can include other well measurements systems or combinations thereof, e.g., electromagnetic, nuclear magnetic resonance, seismic, pulse neutron, or the like. For example, both acoustic measurement (e.g. for leak detection) and EM measurements (e.g. for tubular corrosion detection) can be taken using the well measurement system 100. As illustrated, a borehole or wellbore 101 may extend from a wellhead 103 into a subterranean formation 105 from surface 114. Generally, the wellbore 101 may include horizontal, vertical, slanted, curved, and other types of wellbore geometries and orientations. The wellbore 101 may be cased, partially cased, i.e., cased to a certain depth (as shown), or uncased. In one or more embodiments, the wellbore 101 may include one or more metallic tubulars, e.g. pipes, disposed therein. By way of example, the one or more metallic tubulars may be one or more casing, liner, well string, completion string, production tubing, or other elongated steel tubular disposed in the wellbore 101. In one or more embodiments, one or more casing may be disposed in the wellbore 101, e.g. a plurality of casing may be disposed in the wellbore, with at least one casing concentrically disposed in another. As shown, a first casing 106 is concentrically disposed in a second casing 108. The second casing 108 can have a larger diameter than the first casing 106. Though not clearly shown in FIG. 1, the first casing can be radially spaced from the second casing 108 such that an annulus is formed therebetween (see e.g., FIG. 3). Note, although two layers of casing are shown, there can be multiple layers of casing, e.g. 3, 4, 5, 6, or 7 layers of casing. An annulus is formed between each layer of casing. In addition to the casing, in a producing well it is common to have another tubing, e.g. a completion or production string, disposed within the innermost casing. As shown, production tubing 104 is concentrically disposed within the first casing 106. The production tubing 104 can extend into an uncased portion of the wellbore 101.

As illustrated in FIG. 1, the wellbore 101 may extending generally vertically into the subterranean formation 105; however, the wellbore 101 may extend at an angle (although not shown) through the subterranean formation 105, such as horizontal and slanted wellbores. For example, although FIG. 1 illustrates a vertical or low inclination angle well, high inclination angle or horizontal placement of the well and equipment may be possible. It should further be noted that while FIG. 1 generally depicts a land-based operation, the principles described herein are equally applicable to subsea operations that employ floating or sea-based platforms and rigs, without departing from the scope of the disclosure.

The well measurement system 100 can include one or more downhole tools disposed on a conveyance 116, which may be lowered into wellbore 101. For example, a leak detection tool 102 is disposed on the conveyance 116. As illustrated, the leak detection tool 102 is attached to a vehicle 110 via a drum 132. However, in one or more embodiments, it should be noted that the leak detection tool 102 may not be attached to the vehicle 110, e.g. being instead attached to a crane or rig. The conveyance 116 and the leak detection tool 102 may be supported by a rig 112 at the surface 114.

The leak detection tool 102 may be tethered to the vehicle 110 through the conveyance 116. The conveyance 116 may be disposed around one or more sheave wheels 118 to the vehicle 110. The conveyance 116 may include any suitable means for providing mechanical support and movement for the leak detection tool 102, including, but not limited to, wireline, slickline, coiled tubing, pipe, drill pipe, downhole tractor, or the like. In some embodiments, conveyance 116 may provide mechanical suspension as well as electrical connectivity for the leak detection tool 102. For example, the conveyance 116 may include, in some instances, one or more electrical conductors extending from the vehicle 110 that may be used for communicating power and/or telemetry between the vehicle 110 and the leak detection tool 102.

Information from the leak detection tool 102 can be gathered and/or processed by information handling system 120. For example, signals recorded by the leak detection tool 102 may be stored on memory and then processed by the information handling system 120. The processing may be performed real-time during data acquisition or after recovery of the leak detection tool 102. Processing may occur downhole, at the surface, or may occur both downhole and at surface. In some embodiments, signals recorded by the leak detection tool 102 may be conducted to the information handling system 120 by way of the conveyance 116. The information handling system 120 may process the signals and the information contained therein may be displayed, and/or visualized, for an operator to observe and stored for future processing and reference. The information handling system 120 may also contain an apparatus for supplying control signals and power to the leak detection tool 102.

Systems and methods of the present disclosure may be implemented, at least in part, with the information handling system 120. The information handling system 120 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, the information handling system 120 may be a personal computer, a network storage device, or any other suitable device and may vary in size, shape, performance, functionality, and price. The information handling system 120 may include random access memory (RAM), one or more processing resources such as a central processing unit (CPU) 122 or hardware or software control logic, ROM, and/or other types of nonvolatile memory. Additional components of the information handling system 120 may include one or more disk drives, one or more network ports for communication with external devices as well as an input device 124 (e.g., keyboard, mouse, etc.) and output devices, such as a display 126. The information handling system 120 may also include one or more buses operable to transmit communications between the various hardware components. Although not shown, the information handling system 120 may include one or more network interfaces. For example, the information handling system 120 can communicate via transmissions to and/or from remote devices via the network interface 805 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

Alternatively, systems and methods of the present disclosure may be implemented, at least in part, with non-transitory computer-readable, or machine-readable, media 128. Non-transitory computer-readable media 128 may include any instrumentality or aggregation of instrumentalities that may retain data and/or instructions for a period of time. Non-transitory computer-readable media may include, for example, but not limited to, a system, apparatus, or device, that employs any one of or combination of electronic, magnetic, optical, electromagnetic, infrared, or semiconductor technology to store program code. Non-transitory computer-readable media 128 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other EM and/or optical carriers; and/or any combination of the foregoing. In the context of this document, a computer-readable storage medium may be any tangible medium that can contain or store a program for use by or in connection with an instruction execution system, apparatus, or device. For example, the computer-readable storage medium can comprise program code executable by a processor to cause the processor to perform one or more steps. The computer-readable storage medium can further comprise program code executable by the process to cause or initiate the one or more downhole tools to perform a function, e.g., transmitting a signal, receiving a signal, and/or taking one or more measurements.

The computer-readable media 128 may be a machine-readable signal medium or a machine-readable storage medium. A computer-readable storage medium is not a machine-readable signal medium. A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on computer-readable media 128 may be transmitted using any appropriate medium, including but not limited to wireless, wireline, optical fiber cable, radio frequency (RF), etc., or any suitable combination of the foregoing. Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and procedural programming languages, such as the "C" programming language or similar programming languages. The program code may execute entirely on a stand-alone machine, may execute in a distributed manner across multiple machines, and may execute on one machine while providing results and or accepting input on another machine. The program code/instructions may also be stored in a machine-readable medium that can direct a machine to function in a particular manner, such that the instructions stored in the computer-readable storage medium produce an article of manufacture including instructions which implement the function/act specified in the flowchart and/or block diagram block or blocks.

Figure 2:
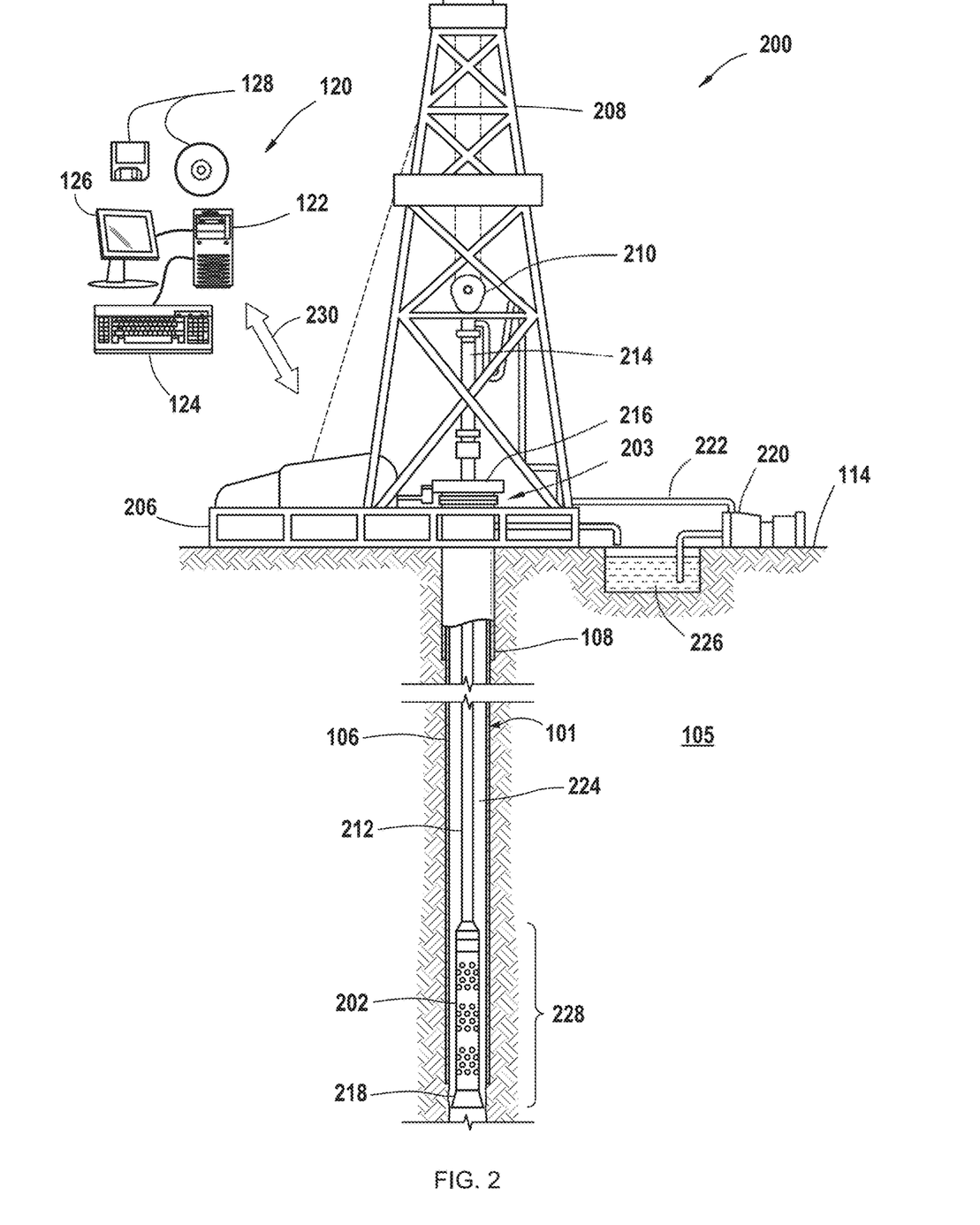
FIG. 2 depicts a schematic diagram of a drilling system for well measurement, according to one or more embodiments.

FIG. 2 depicts a schematic diagram of a drilling system 200 for well measurement, according to one or more embodiments. FIG. 2 depicts the wellbore 101 in the processing of being drilled, i.e. before production tubing 104 is disposed in the wellbore 101. A leak detection tool 202 is disposed, i.e. conveyed, in the wellbore 101 via the drilling system 200. The drilling system 200 includes a drilling platform 206 that supports a derrick 208 having a traveling block 210 for raising and lowering drill string 212. Drill string 212 may include, but is not limited to, drill pipe and coiled tubing. A kelly 214 may support the drill string 212 as it may be lowered through a rotary table 216. A drill bit 218 may be attached to the distal end of the drill string 212 and may be driven either by a downhole motor and/or via rotation of drill string 212 from the surface 114. Without limitation, the drill bit 218 may include, roller cone bits, PDC bits, natural diamond bits, any hole openers, reamers, coring bits, and the like. As the drill bit 218 rotates, it may create and extend wellbore 101 that penetrates the subterranean formation 105. A pump 220 may circulate drilling fluid through a feed pipe 222 to kelly 214, downhole through interior of drill string 212, through orifices in drill bit 218, back to surface 114 via annulus 224 surrounding drill string 212, and into a retention pit 226. As shown, the wellbore 101 has already been partially drilled and has two concentric sets of casing, the first casing 106 and the second casing 108, disposed in the wellbore 101. The drill bit 218 can be extended beyond the depth of the first casing 106 to further extend the wellbore 101 into the formation 105.

The drill string 212 begins at wellhead 203 and can traverse wellbore 101. The drill bit 218 is attached to a distal end of the drill string 212 and may be driven, for example, either by a downhole motor and/or via rotation of the drill string 212 from surface 114. Drill bit 218 may be a part of bottom hole assembly (BHA) 228 at distal end of drill string 212. In one or more embodiments, the BHA 228 may further include the leak detection tool 202. The leak detection tool 202 can be disposed on the outside and/or within the BHA 228. The leak detection tool 202 may include one or more transmitters and/or one or more receivers, as will be described further in FIG. 3. In addition to the leak detection tool 202, the BHA 228 may include other downhole tools that are part of a measurement-while drilling (MWD) or logging-while-drilling (LWD) system, such as directional tools, ranging tools, formation evaluation tools, etc.

In the drilling system, the leak detection tool 202 can be used as the BHA 228 is passing through the downhole tubulars, e.g. the first casing 106, the second casing 108, or other nested tubulars already in the wellbore 101. For example, after a portion of the wellbore 101 has been extended, the drill string 212 can be raised out of the wellbore 101, i.e. "tripped out of the hole." During the raising of leak detection tool 202 from the extent of the innermost casing, e.g. first casing 106, to the wellhead 203, the leak detection tool 202 can take one or more acoustic measurements to determine if the nested tubulars, e.g. the first casing 106 and second casing 108, potentially have a leak.

The leak detection tool 202 can be connected to and/or controlled by the information handling system 120. The information handling system 120 may be disposed at the surface 114 or downhole, and thus processing of information recorded may occur downhole and/or on surface 114. Processing occurring downhole may be transmitted to surface 114 to be recorded, observed, and/or further analyzed. Additionally, information recorded on the information handling system 120 that may be disposed downhole may be stored until the leak detection tool 202 is brought to surface 114.

Figure 3:
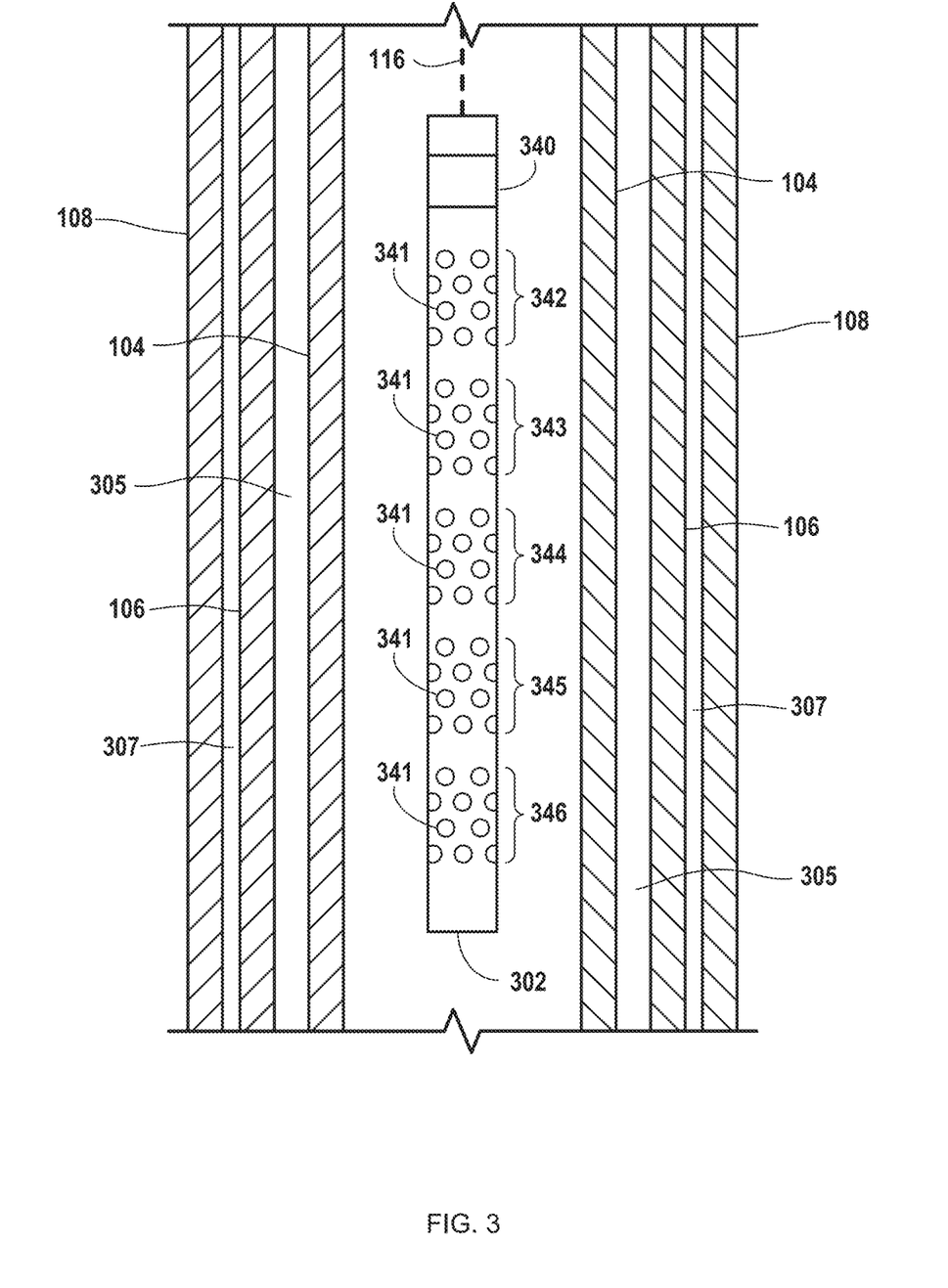
FIG. 3 depicts a cross-sectional view of an acoustic leak detection tool, according to one or more embodiments.

FIG. 3 depicts a cross-sectional view of an acoustic leak detection tool 302, according to one or more embodiments. The leak detection tool 302 is shown suspended from the conveyance 116 and disposed within multiple nested tubulars (depicted as three layers of tubulars, i.e. production tubing 104, first casing 106, and second casing 108). The nested tubulars can form one or more annulus between concentric tubulars (e.g. a first annulus 305 formed between the production tubing 104 and the first casing 106 and a second annulus 307 formed between the first casing 106 and the second casing 108). As noted above, the conveyance 116 can be any of the conveyances listed in FIG. 1 and can also include the drill string 212 in FIG. 2. Although three layers of tubulars, i.e. three layers of nested pipe, are shown, the leak detection tool 302 could be deployed in a greater number of tubulars, as mentioned above, and additional annuli can be formed between each additional concentric, i.e. nested, tubulars.

The leak detection tool 302 can have one or more receivers (five receivers are shown: a first receiver 342, a second receiver 343, a third receiver 344, a fourth receiver 345, and a fifth receiver 346). Each receiver can comprise one or more acoustic sensors 341. The acoustic sensors 341 can be disposed in one or more array, i.e., forming an array of acoustic sensors. The array can be axially disposed (i.e. down the length of the tool), radially disposed (i.e. circumferentially disposed about the axis), or at another angle. As shown, the acoustic sensors can be both radially and axially disposed to form a receiver, i.e. forming a grid about the tool both axially and radially. In one or more embodiments, the acoustic sensors are hydrophones, and the array of acoustic sensors is an array of hydrophones. In other embodiments, fiber Bragg grating (FBG) sensors or segments of a distributed fiber-optic cable can be used as acoustic sensors.

In one or more embodiments, the leak detection tool 302 has a transmitter 340. For example, the transmitter can be an acoustic source or striking element, e.g. a percussive hammer that can strike the innermost tubular to produce an acoustic signal. However, while a transmitter is shown, a transmitter is not required, i.e. the leak detection tool 302 can only have receivers to detect one or more noise source in the multiple nested tubulars. For example, the leak detection tool 302 can be arranged to be sensitive to one or more downhole noise sources without inducing or transmitting an acoustic signal itself.

In one or more embodiments, the measurements by multiple acoustic sensors 341 of each of the one or more receivers 342-346 at each depth is recorded in, i.e. form, a log and then processed to form a response image. Each acoustic sensor 341 in the sensor arrays measures an acoustic signal. The acoustic signal can be recorded, e.g. in memory downhole or at the surface telemetry, in the time domain (e.g. amplitude vs. time) and/or in the frequency domain (e.g. power spectral density vs. frequency).

In one or more embodiments, a plurality of acoustic signals are detected substantially simultaneously (or, more generally, with known temporal relations therebetween) by a group of acoustic sensors (e.g. in an array or grid in each receiver) at each tool depth can be combined (or "fused") into a single signal, e.g. by forming a linear combination that approximates the signal as emitted by the source (or a combination of multiple sources). For example, signals from an array of acoustic sensors (or all the acoustic sensors in a receiver if not technically arranged in an array) can be combined (i.e. fused) into a fused measurement that can be further processed akin to a single sensor signal. Thus, multiple arrays of sensors can produce multiple fused measurements. "Substantially simultaneously" herein indicates that the time intervals over which signals are collected overlap significantly (e.g., by at least 90% or at least 99%) between the different sensors. Because time shifts between the different sensors due to different travel times from the source to the sensors are generally small (e.g., on the order of one millisecond (ms)) compared to the total signal-collection interval (e.g., on the order of 100 ms), significant overlap in the collection intervals generally ensures that the emission time periods corresponding to the measured signals likewise overlap significantly, facilitating array-signal processing. In the (rare) event that time shifts between the different sensors are significant in comparison to the overall collection interval, they can be compensated for by shifting the collection intervals between the various sensors accordingly so as to ensure that all sensors measure substantially the same emission time period.

Signal fusion can generally be accomplished by array signal processing. Array-signal-processing techniques include various spatial filtering methods (also often referred to as "beamforming" methods). In one or more embodiments, array-signal-processing methods can rely on a forward model of wave propagation from the noise source(s), e.g. leak(s), to the acoustic sensors to solve an inverse problem, i.e., to determine source signal from the signals received/measured at the acoustic sensors 341. In one or more embodiments, the forward model is adjusted to account for the configuration of the wellbore and surrounding formation (which collectively include various propagation media and boundaries therebetween) and their effect on the wave field (e.g., wave refractions, reflections, and resonances), as well as to facilitate the processing of near-field signals, i.e., signals originating from a source whose distance from the sensors is not significantly (e.g., orders of magnitude) larger than the spatial extent of the acoustic sensor array.

Figure 4:
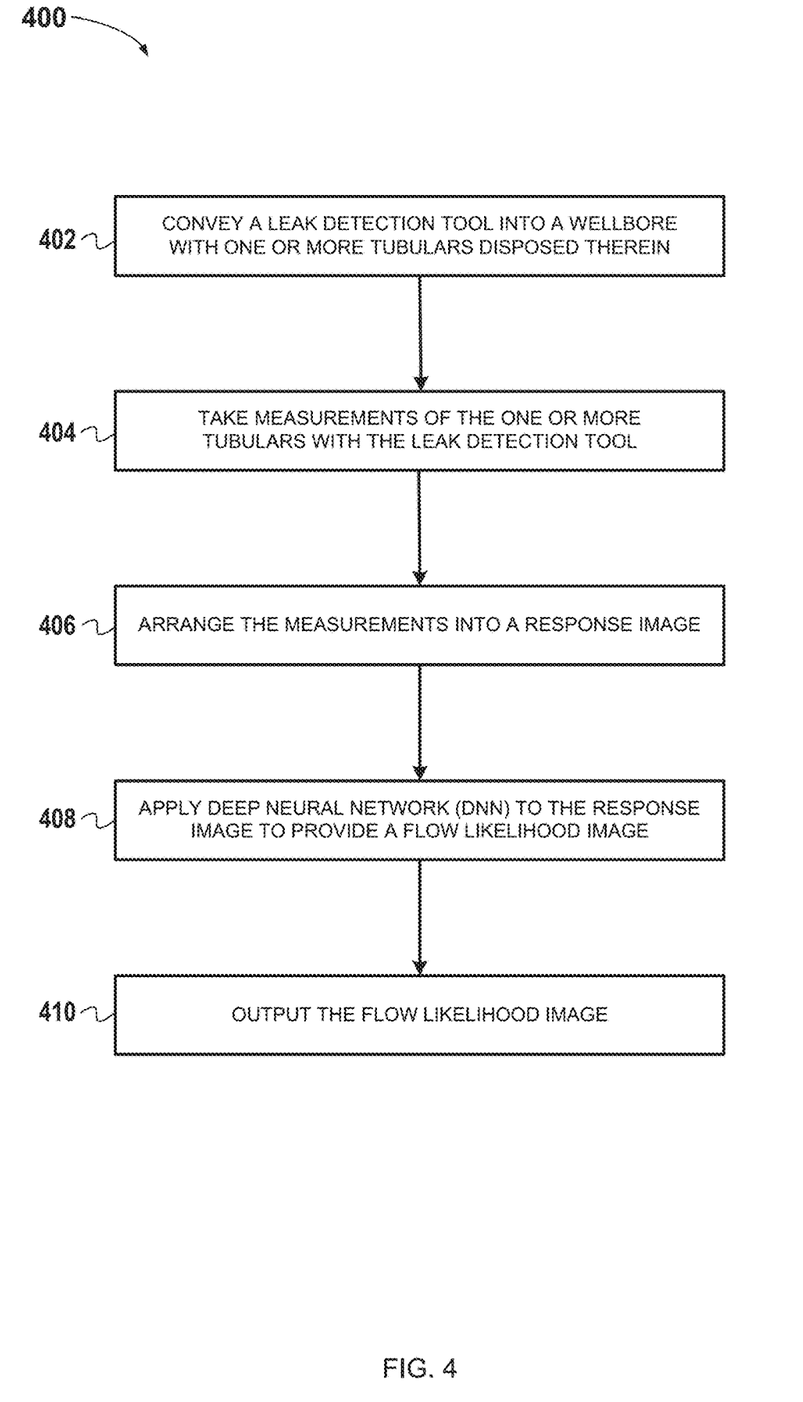
FIG. 4 depicts a flowchart of a machine learning based method for leak detection, according to one or more embodiments.

FIG. 4 depicts a flowchart of a machine learning based method 400 for leak detection, according to one or more embodiments. At 402, an acoustic leak detection tool (e.g. the leak detection tool 102, the leak detection tool 202, or the acoustic leak detection tool 302) is disposed into a wellbore (e.g. wellbore 101) having one or more tubulars disposed therein (e.g. production tubing 104, first casing 106, and second casing 108, or more tubulars). In one or more embodiments, the one or more tubulars are multiple nested tubulars, and the leak detection tool is disposed, e.g. via a conveyance, inside an inner most tubular of the multiple nested tubulars.

At 404, measurements of the one or more tubulars are taken with the leak detection tool, e.g. via one or more receivers. For example, acoustic measurements are taken with the acoustic sensors to record one or more acoustic signals produced by noise produced by one or more leaks in at least one of the one or more tubulars. These acoustic measurements taken over depth are the response, i.e. raw measurements at each depth measurement. In one or more embodiments, a transmitter (e.g. the transmitter 340) can excite sound waves in the one or more tubulars, e.g. via percussion excitation of the innermost tubular, the response of which is measured by one or more receivers (e.g. the receivers 342-346). The initial measured response can be output as a log of raw measurements for each receiver and/or each acoustic sensor in the sensor array. In one or more embodiments, the measurements taken are initiated by one or more non-transitory machine-readable media comprising program code for detecting one or more leaks in the multiple nested tubulars.

At 406, the measurements from each sensor, each sensor array, and/or each receiver are arranged into, e.g. accumulated to form, a response image, e.g. a two-dimensional (2D) response image that is a 2D representation of the tool response. Measurements in the time-domain (e.g. acoustic amplitude vs. time/depth), those in the frequency-domain (e.g. power spectral density vs. frequency), or both can be arranged into a the 2D response image over depth. "Depth" here refers to an axial measurement of depth along the axis of the tubular(s), sometimes referred to as "measured depth" or "logging depth". Measurements of the multiple nested tubulars can be taken at multiple measurement depths with the acoustic leak detection tool.

For time-domain measurements, the acoustic amplitude (e.g. a normalized acoustic amplitude) of the acoustic signal (e.g. for each sensor, for each sensor array, or for each receiver) versus depth can form a log. For example, each measurement for each sensor at each depth and amplitude can be mapped to a log data point on the log to form the log for each sensor. In another example, each measurement for each sensor array of the receiver, i.e. a fused signal measurement, at each measurement depth and amplitude can be mapped to a log data point on the log to form the log for each sensor array. The log data point can also be a line perpendicular to the Y-axis, i.e. instead of a single point. Each log of each sensor, each array, or each receiver can form a channel in the 2D response image, such that the 2D response image represents multiple channels. For example, the logs from multiple acoustic sensors, multiple arrays, or multiple receivers can be juxtaposed to form a 2D response image. The 2D response image can be a reflection of how much each channel changes, e.g. how the channel's response varies from a nominal or expected value, when it encounters a feature, i.e. noise source that may represent a leak, at a particular depth.

For the time-domain measurements, a first dimension of the 2D response image is depth and a second dimension is the channels of either the different sensors, the different sensor arrays, or the different receivers. In one or more embodiments, each log data point is represented by a pixel in the 2D image, and a value assigned to each pixel in the 2D response image is proportional to a percentage change of each log data point from a nominal value of that log data point. For example, in the 2D response image the pixel value can be displayed as a color, gray scale, or brightness (e.g. based on a numeric scale). In one or more embodiments, the pixel value represents a difference (e.g. a percentage difference) of the acoustic amplitude from the nominal acoustic amplitude value of that pixel. In other embodiments, the pixel value represents a normalized acoustic amplitude, e.g., with the lowest measured amplitude set to 0 and the highest measured value set at 1.

For frequency-domain measurements, the power spectral density of the acoustic signal versus frequency measured at every depth can form a log. For example, each measurement for each sensor at each depth and amplitude can be mapped to a log data point on the log to form the log for each sensor. In another example, each measurement of the power spectral density of the acoustic signal for each sensor array of the receiver, i.e. a fused signal of the measurements of each sensor, at each depth and frequency can be mapped to a log data point on the log to form the log for each sensor array. The log data point can also be a line perpendicular to the Y-axis, i.e. instead of a single point. Each log of each sensor, each array, or each receiver can form a channel in the 2D response image, such that the 2D response image represents multiple channels. For example, the logs from multiple acoustic sensors, multiple arrays, or multiple receivers can be juxtaposed to form a 2D response image. The 2D response image can be a reflection of how much each channel changes, e.g. how the channel's response varies from a nominal or expected value, when it encounters a feature, i.e. noise source that may represent a leak, at a particular depth.

For the frequency-domain 2D response image, a first dimension of the 2D response image is depth and a second dimension is the frequency (e.g., of either the different sensors, the different sensor arrays, i.e. with a fused measurement, or the different receivers). In one or more embodiments, each log data point is represented by a pixel in the 2D image, and a value assigned to each pixel in the 2D response image is proportional to a percentage change of each log data point from a nominal value of that log data point. For example, in the 2D response image the pixel value can be displayed as a color, gray scale, or brightness (e.g. based on a numeric scale). In one or more embodiments, the pixel value represents a difference (e.g. a percentage difference) of the power spectral density from the nominal power spectral density value of that pixel. In other embodiments, the pixel value can represent a normalized power spectral density, e.g., with the lowest measured amplitude set to 0 and the highest measured value set at 1.

At 408, a deep neural network (DNN) is applied to the response image, e.g. the 2D response image, to provide a flow likelihood image. In one or more embodiments, the response image is fed to a pre-trained DNN to produce one or more flow likelihood images representing one or more flow patterns in at least one anulus formed by the multiple nested tubulars. In one or more embodiments, the response image is split into sections based on depth, and each section is separately and/or sequentially fed to the DNN. Herein, a neural network is considered "deep" when a network has a plurality of layers, i.e. more than three layers. For example, a DNN has at least in input layer, an output layer, and one or more hidden layers, e.g. multiple hidden layers. In one or more embodiments, the DNN has at least one convolutional layer. A DNN with at least one convolutional layer is hereafter referred to as a convolutional neural network (CNN). A convolutional layer is defined as a layer in a neural network that implements a convolution. A convolution can include a cross-correlation. In one or more embodiments, the DNN is not a conventional DNN. The CNN can include one or more convolutional layers plus one or more fully connected layers, one or more pooling layers (e.g. local, global, max, or average pooling), one or more up-sampling layers, one or more dense layers, one or more concatenation layers, one or more summation layers, and/or other available layers used in CNNs. The learning in the CNN can be done at multiple levels, e.g. using microscope to capture fine details and telescope to see a bigger picture, to find both small and big errors.

Figure 5:
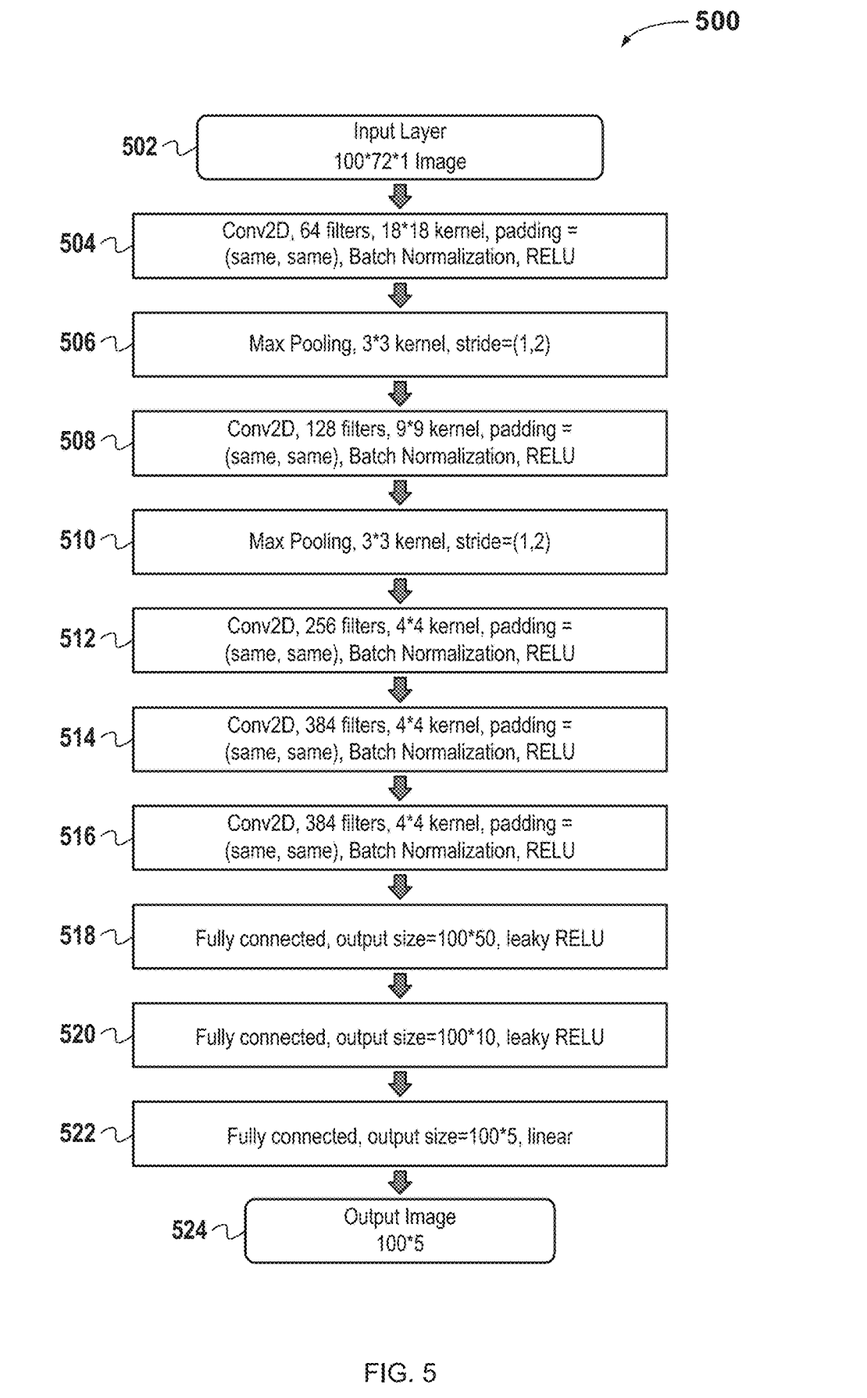
FIG. 5 depicts an example architecture of a deep neural network (DNN) having at least one convolutional layer, according to one or more embodiments.

FIG. 5 depicts an example architecture 500 of a DNN having at least one convolutional layer, according to one or more embodiments. In the architecture 500, the size of the input image, e.g. the 2D response image, is M*N*P, where M is the number depth points (points over depth where measurements are taken), N is the number of measured acoustic signals, e.g. either amplitude or power spectral density, at a single depth point, and P is the number of channels for each signal. In the example shown by the architecture 500, an input layer 502 takes a response image where M=100, N=72, and P=1. The size of output image, e.g. the flow likelihood image, is M*K, where K is the radial distance displayed in the image, i.e. the distance correlating to the depth of investigation radially. In the example shown by the architecture 500, at an output layer 524 a flow likelihood image is output where M=100 and K=5, i.e. the output image has 100 depth points and a radial distance of five distance units, e.g. 5 inches (in).

Between the input layer 502 and the output layer 524 are 10 layers, i.e. 10 hidden layers 504-522. Although 10 layers are shown in this example architecture 500, there could be only 1 hidden layer, between 2 and 9 hidden layers, or more than 10 hidden layers. A first hidden layer 504 is a first convolutional layer, e.g. a 2D convolutional layer ("Conv2D") with one or more 2D filters (i.e. one or more convolutional filters), with padding and batch output applied and having a RELU activation function. The first convolutional layer has 64 filters with an 18*18 kernel. A second hidden layer 506 is a first max pooling layer with a 3 by 1 window size in the windows first and second dimension, respectively, and a stride of 2 and 1 in the first and second dimension, respectively. A third hidden layer 508 is a second convolutional layer with padding and batch output applied and having a RELU activation function. The second convolutional layer has 128 filters with a 9*9 kernel.

A fourth hidden layer 510 is a second max pooling layer with a 3 by 1 window size in the windows first and second dimension, respectively, and a stride of 2 and 1 in the first and second dimension, respectively. A fifth hidden layer 512 is a third convolutional layer with padding and batch output applied and having a RELU activation function. The third convolutional layer has 256 filters with a 4*4 kernel. A sixth hidden layer 514 is a fourth convolutional layer with padding and batch output applied and having a RELU activation function. The fourth convolutional layer has 384 filters with a 4*4 kernel. A seventh hidden layer 516 is a fifth convolutional layer with padding and batch output applied and having a RELU activation function. The fifth convolutional layer has 384 filters with a 4*4 kernel.

An eighth hidden layer 518 is a first fully connected layer having an output size of 100*50 and using a leaky RELU activation function. A ninth hidden layer 520 is a second fully connected layer having an output size of 100*10 and using a leaky RELU activation function. A tenth hidden layer 522 is a third fully connected layer having an output size of 100*5 and using a leaky RELU activation function. The tenth hidden layer 522 feeds into the output layer 524 described above to provide the flow likelihood image.

The example architecture 500 is just one way of constructing a DNN with one convolutional layer, i.e. constructing a CNN. Other configurations can be used for different input sizes or different processing. For example, one or more concatenation layers, e.g. to concatenate two images is a third dimension, or one or more summation layers, e.g. to sum two images is a third dimension, and one or more up-sampling layers can be used. Further, different numbers of convolutional, pooling, and fully connected layers can be used, as well as different parameter settings for each layer shown and any different layers added.

Figure 6:
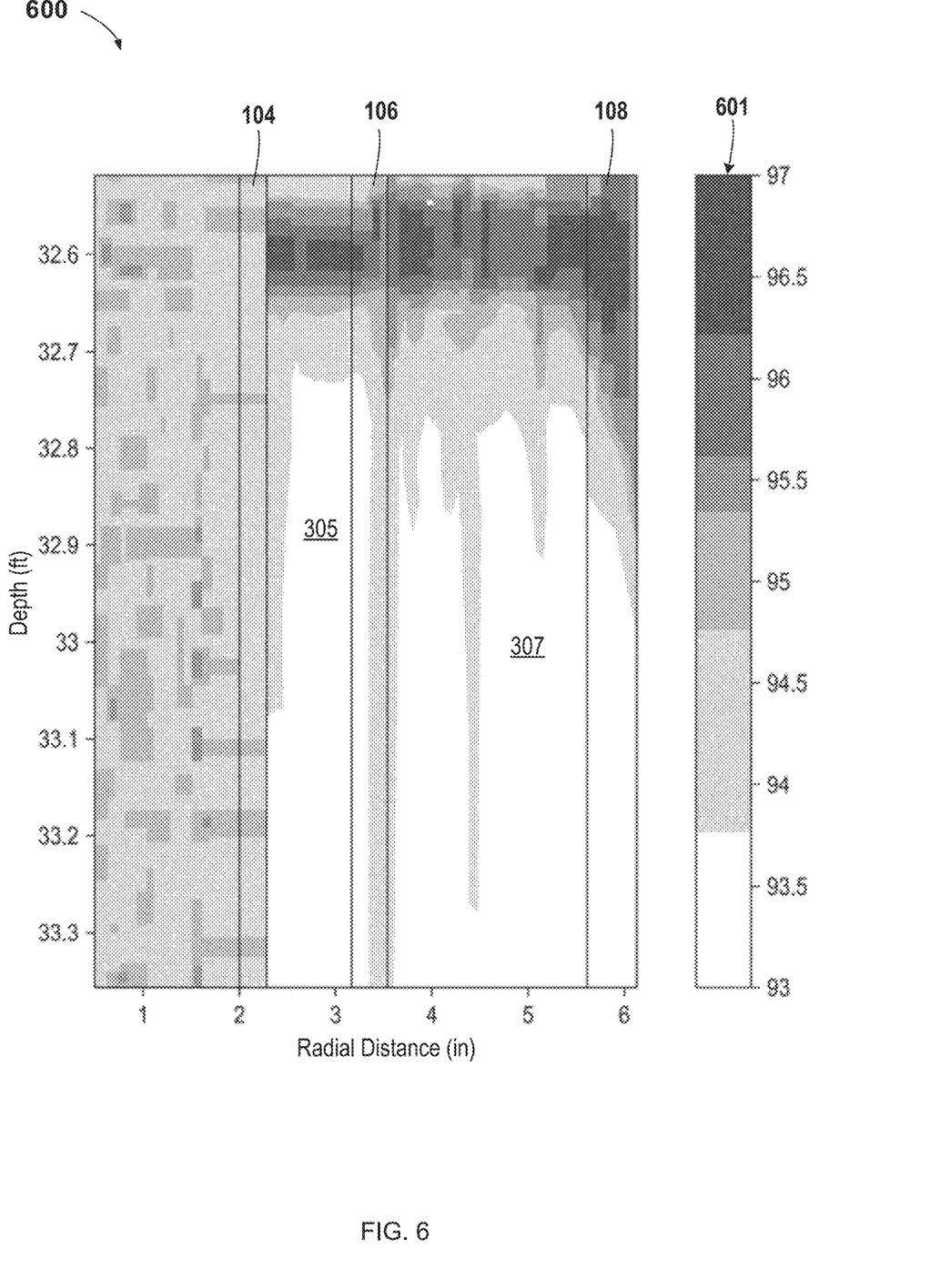
FIG. 6 illustrates an example flow likelihood image that can be obtained using the example method described above, according to one or more embodiments.

FIG. 6 illustrates an example flow likelihood image 600 that can be obtained using the example method described above. In flow likelihood image 600, a radial distance from the longitudinal axis of the wellbore (or the longitudinal axis of the acoustic leak detection tool) is represented on the X-axis and the wellbore depth is represented on the Y-axis. The flow likelihood image 600 also depicts annuli (e.g. first annulus 305 and second annulus 307 as shown) defined between corresponding concentric tubulars (e.g. production tubing 104, first casing 106, and second casing 108 as shown). The shaded scale 601 to the right of the flow likelihood image 600 indicates the likelihood (or probability) of a flow. As illustrated, the flow likelihood image 600 indicates a high likelihood of flow from the first annulus 305 to the second annulus 307 around 32 feet from the surface.

Referring again to FIG. 4, at 412, the method 400 can output the flow likelihood image. For example, the flow likelihood image can be displayed, recorded, printed, or fed to another method. The flow likelihood image includes a representation of one or more flow patterns in at least one annulus formed by the multiple nested tubulars. For example, the flow likelihood image can include a representation of one or more flow patterns in at least one of the annuli that indicate one or more leaks in at least one of the multiple nested tubulars. The flow likelihood image is made up of pixels. In one or more embodiments, a value is assigned to each pixel of the flow likelihood image is proportional to a percentage likelihood (i.e. probability) of flow, e.g. due to a leak, in at least one annulus formed by the multiple nested tubulars.

The flow likelihood image can include the location of the leaks in the multiple nested tubulars, and thereby can provide a report of the integrity of the multiple nested tubulars. This information can be combined with other information, e.g. from a corrosion detection tool or the like. As such, the method is an inspection of the integrity of the multiple nested tubulars.

FIG. 4 is annotated with a series of numbered blocks 402-412. These numbered blocks represent stages of operations. Although these stages are ordered for this example, the stages illustrate one example to aid in understanding this disclosure and should not be used to limit the claims. Subject matter falling within the scope of the claims can vary with respect to the order and some of the operations.

Figure 7:
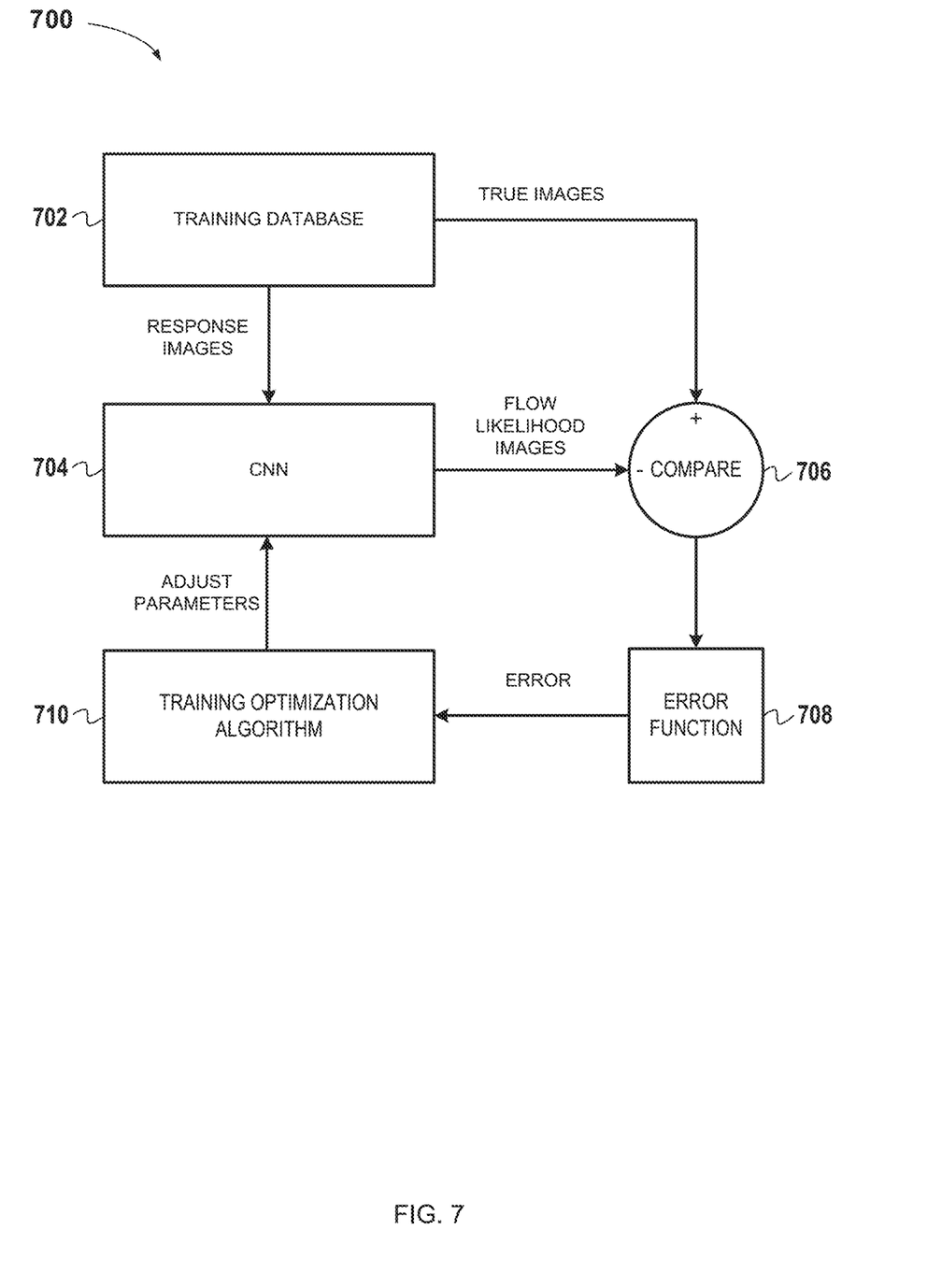
FIG. 7 depicts a flowchart of a method for training a DNN having at least one convolutional layer, according to one or more embodiments.

FIG. 7 depicts a flowchart of a method 700 for training a DNN having at least one convolutional layer, according to one or more embodiments. In one or more embodiments, the DNN with at least one convolutional layer, e.g. CNN 704, is be pre-trained. Training the DNN begins with building a training database 702 using at least one of simulation or measurements of known cases. The training database 702 is built with a plurality of samples. Each sample of the plurality of samples includes a true image of one or more leaks, e.g. as a flow likelihood image, in one or more nested tubulars and a corresponding response image. Both the true image and the response image used for the sample are for a corresponding number of depth points. For example, a sample can be obtained using simulations, e.g. simulated raw response images for a simulated true image of a simulated set of one or more tubulars. A sample can also be obtained by raw measurements of known case, i.e. by recording response images based on real measurements for multiple nested tubulars with the acoustic sensors, where the multiple nested tubulars have known leaks which are captured as the true image for purposes of training the DNN. The samples can include a response image for array of sensors and/or from each receiver. In one or more embodiments, the response image used from the sample can be from a small set of sensors or from large set of sensors.

The more samples in the training database 702 and the more diverse the samples, the better the performance of the DNN. The training database 702 can comprise at least 5,000 samples, at least 7,500 sample, or at least 10,000 samples, for example. The samples can have different number of tubulars, different positions of the tubulars, different thicknesses, different metal grades, different parameters of eccentricity of the tubulars, different ovality, different bending, etc., and combinations thereof. In addition, the samples can have different downhole temperature profiles and different pressure profiles.

To begin training, the sample response images from the training database 702 are fed to the CNN 704 (i.e. a DNN having one or more convolutional layer) to produce output images, i.e. flow likelihood images. The process of training finds optimum network parameters to minimize misfit between flow likelihood images produced by the CNN 704 and corresponding true images in the training database 702 according to an error metric. The CNN 704 outputs a flow likelihood image, and the corresponding true image from the training database 702 is compared at 706 with the flow likelihood image. The comparison 706 is evaluated via an error function 708. The error function 708 is defined as the sum of square errors of the flow likelihood for each pixel, represented by the following equation:

$$E_n = \sum_{i=1}^{M} (p_i - q_i)^2 \quad (1)$$

where $E_n$ is the error between the true flow image and the flow likelihood image produced by the CNN 704 for the $n^{th}$ training example, n is the index of training examples, i is the index of pixels, M is the number of pixels in an image, p is the true image (i.e. an actual flow map due to one or more leak in the tubular(s)), and q is the flow likelihood image (i.e. a flow likelihood map of the tubular(s) estimated by the CNN).

The calculated error is fed to a training optimization algorithm 710 which can include a loss function defined as the mean square error for a whole training batch defined, represented as follows:

$$L = \Sigma_{n \in batch} E_n \quad (2)$$

where L is the loss function, and batch represents the whole training batch. The loss can also be calculated using mini-batches, e.g. using mini-batch gradient descent, where the minibatches are a subset of the total dataset. The size of the minibatch is a hyperparameter that can be adjusted during training to optimize results. Other network parameters, e.g. hyperparameters, weight parameters, of the CNN can be adjusted based on the training optimization algorithm 710. In one or more embodiments, the training optimization algorithm can use gradient descent.

In one or more embodiments, cross-validation, e.g. exhaustive or non-exhaustive, is used to evaluate the accuracy of the CNN 704. For example, K-fold cross-validation can be used to evaluate accuracy of the CNN 704. K-fold cross-validation uses a single parameter "K" that refers to the number of groups that a given sample dataset can be randomly split into. K-fold cross-validation can estimate the skill of the CNN 704 on unseen data, e.g. estimating how the CNN 704 is expected to perform in general when used to make predictions on data not used during training. In one or more embodiments, K=10, but other K, e.g. 5, 15, or 20, can be chosen. For example, a K value can be chosen that evenly splits the data set into groups have the same number of samples. In one or more embodiments, a single subsample is retained as validation data for testing the CNN 704, and the remaining K−1 subsamples are used as training data. Other types of cross-validations can be used, e.g. leave-p-out cross-validation, leave-one-out cross-validation (equivalent to K-fold cross-validation where the number of observations equals K), holdout cross-validation, Monte Carlo cross-validation, or nested cross-validation (e.g. k*1-fold cross-validation), or the like.

During training the sample dataset can be split from the training database 702 into a training set containing training data, a test set containing test data, and a validation set containing validation data. To avoid over-fitting to the training set, the training can be stopped if there is no improvement for a validation set for 3 consecutive epochs. An "epoch" is a single iteration over the entire training set, i.e. one pass through all the training data. For example, for a training set of size d and a mini-batch size b, then an epoch would be equivalent to d/b model updates. In one or more embodiments, the training is complete when the error in the validation data is decreasing, when the CNN 704 performs well on the training data, and when the CNN 704 performs well on the test data. In one or more embodiments, the test data is not used for training of the CNN 704.

The flowcharts herein are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more computer-readable media (e.g. computer-readable media 128 in FIGS. 1-2). Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Figure 8:
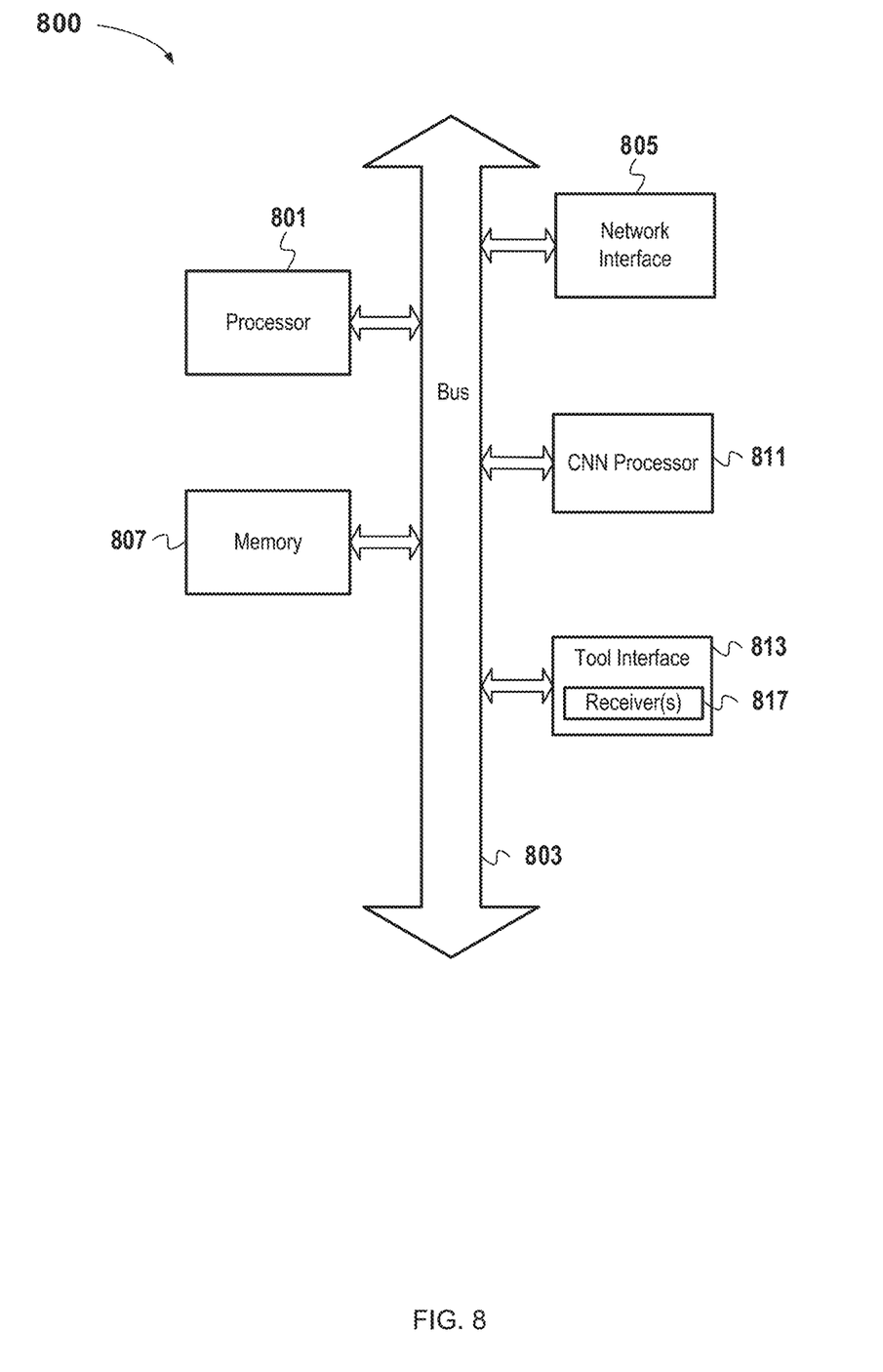
FIG. 8 depicts an example computer system with functionality and/or one or more processors for carrying out one or more of the methods described above, according to one or more embodiments.

FIG. 8 depicts an example computer system 800 with functionality and/or one or more processors for carrying out one or more of the methods described above, according to one or more embodiments. The computer system includes a processor 801 (possibly including multiple processors, multiple cores, multiple nodes, and/or implementing multithreading, etc.) and memory 807. The memory 807 may be system memory or any one or more of the above already described possible realizations of machine-readable media. The computer system also includes a bus 803 and a network interface 805. The system communicates via transmissions to and/or from remote devices via the network interface 805 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.). The system also includes CNN processor 811 and a tool interface 813. The CNN processor 811 can perform one or operations to train the CNN and to produce one or more flow likelihood images based on response images fed thereto according to any of the embodiments described above. The tool interface 813 includes one or more receiver interfaces 817. Although not shown, the tool interface 813 can also include one or more transmitter interface, e.g. when a transmitter is included in the leak detection tool. A machine-readable medium having program code executable by the processor 801 can initiate measurements of the multiple nested tubulars (as described above) via the tool interface 813. For example, program code can initiate measurements of the multiple nested tubulars via one or more receivers via the receiver interface 817. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 10 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

While the aspects of the disclosure are described with reference to various implementations and exploitations, it will be understood that these aspects are illustrative and that the scope of the claims is not limited to them. In general, techniques for training and operating neural networks as described herein, such as embodiments of DNNs and CNNs described above, may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Unless otherwise specified, use of the terms "connect," "engage," "couple," "attach," or any other like term describing an interaction between elements is not meant to limit the interaction to direct interaction between the elements and may also include indirect interaction between the elements described. Unless otherwise specified, use of the terms "up," "upper," "upward," "up-hole," "upstream," or other like terms shall be construed as generally from the formation toward the surface, e.g., toward wellhead 14 in FIG. 1, or toward the surface of a body of water; likewise, use of "down," "lower," "downward," "down-hole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis. Unless otherwise specified, use of the term "subterranean formation" shall be construed as encompassing both areas below exposed earth and areas below earth covered by water such as ocean or fresh water.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. As used herein, the term "or" is inclusive unless otherwise explicitly noted. Thus, the phrase "at least one of A, B, or C" is satisfied by any element from the set {A, B, C} or any combination thereof, including multiples of any element.

EXAMPLE EMBODIMENTS

Numerous examples are provided herein to enhance understanding of the present disclosure. A specific set of example embodiments are provided as follows:

Example A: A method for leak detection comprising: conveying an acoustic leak detection tool inside an innermost tubular of multiple nested tubulars, wherein the acoustic leak detection tool has one or more acoustic sensors; taking measurements of the multiple nested tubulars at multiple measurement depths with the acoustic leak detection tool; arranging the measurements into a response image; and feeding the response image to a pre-trained deep neural network (DNN) to produce a flow likelihood image, wherein the DNN comprises at least one convolutional layer, and wherein the flow likelihood image comprises a representation of one or more flow patterns in at least one annulus formed by the multiple nested tubulars.

In one or more embodiments of Example A, the one or more acoustic sensors are hydrophones. In one or more embodiments of Example A, the one or more acoustic sensors comprises one or more arrays of acoustic sensors, and optionally, wherein taking measurements of the multiple nested tubulars at the multiple measurement depths with the acoustic leak detection tool comprises measuring an acoustic signal with each of the sensors of the one or more arrays, the method further comprising combining the measured acoustic signals from each of the sensor of the one or more arrays into fused measurements, optionally, wherein the measured acoustic signals from each of the sensors are combined with a spatial filtering method or a beamforming method and/or wherein the one or more arrays comprises multiple arrays, wherein each of the fused measurements comprises an acoustic amplitude at each measurement depth of the multiple measurement depths or a power spectral density versus frequency at each of the multiple measurement depths, wherein the fused measurements for each array of the multiple arrays form a log, wherein logs from the multiple arrays are juxtaposed to form the response image, and wherein the response image comprises a two-dimensional (2D) representation of a tool response to one or more leakage paths in the multiple nested tubulars. In one or more embodiments of Example A, taking measurements of the multiple nested tubulars at the multiple measurement depths with the acoustic leak detection tool comprises measuring an acoustic signal with each sensor of the one or more acoustic sensors, and, optionally, wherein the one or more acoustic sensors comprises multiple acoustic sensors, wherein each measurement comprises an acoustic amplitude at each measurement depth of the multiple measurement depths or a power spectral density versus frequency at each of the multiple measurement depths, wherein the measurements for each sensor of the multiple acoustic sensors form a log, wherein logs from the multiple acoustic sensors are juxtaposed to form the response image, and wherein the response image comprises a two-dimensional (2D) representation of a tool response to one or more leakage paths in the multiple nested tubulars.

In one or more embodiments of Example A, arranging the measurements into the response image comprises: mapping each measurement at each depth to a log data point on a log for each of the one or more acoustic sensor or an array of acoustic sensors; and assigning a value to each pixel in the response image, wherein the value represents one of a difference of an acoustic amplitude from a nominal acoustic amplitude value, a normalized acoustic amplitude, a difference of a power spectral density from a nominal power spectral density value, and a normalized power spectral density. In one or more embodiments of Example A, the one or more flow patterns indicate one or more leaks in at least one of the multiple nested tubulars. In one or more embodiments of Example A, a value assigned to each pixel in the flow likelihood image is proportional to a percentage likelihood of flow in at least one annulus formed by the multiple nested tubulars. In one or more embodiments of Example A, feeding the response image to the pre-trained DNN comprises splitting the response image into sections based on depth. In one or more embodiments of Example A, the pre-trained DNN further comprises at least one of a concatenation layer, a summation layer, a max pooling layer, an up-sampling layer, and a dense layer.

The method in Example A can further comprise training the DNN to provide the pre-trained DNN, wherein training the DNN comprises building a database by using at least one of measurements of known cases and simulation, wherein the database includes a plurality of samples, and wherein each sample of the plurality of samples comprises a true image of an actual flow map due to one or more leak in the multiple nested tubulars and a corresponding response image, and, optionally, wherein training the DNN further comprises finding optimum network parameters to minimize a misfit between output images produced by the DNN and corresponding true images according to an error metric.

Example B: One or more non-transitory computer-readable media comprising program code for leak detection, the program code to: initiate measurements of multiple nested tubulars at multiple measurement depths with an acoustic leak detection tool conveyed inside an innermost tubular of the multiple nested tubulars; arrange the measurements into a response image; and feed the response image to a pre-trained DNN to produce a flow likelihood image, wherein the DNN comprises at least one convolutional layer, and wherein the flow likelihood image comprises a representation of one or more flow patterns in at least one annulus formed by the multiple nested tubulars. In one or more embodiments of Example B, the one or more flow patterns indicate one or more leaks in at least one of the multiple nested tubulars. In one or more embodiments of Example B, a value assigned to each pixel in the flow likelihood image is proportional to a percentage likelihood of flow in at least one annulus formed by the multiple nested tubulars.

Example C: A system comprising: an acoustic leak detection tool disposed inside an innermost tubular of multiple nested tubulars; a pre-trained DNN comprising at least one convolutional layer; a processor; and a computer-readable medium having program code executable by the processor to: initiate measurements of the multiple nested tubulars at multiple measurement depths with the acoustic leak detection tool conveyed inside the innermost tubular; arrange the measurements into a response image; and feed the response image to the pre-trained DNN to produce a flow likelihood image, wherein the flow likelihood image comprises a representation of one or more flow patterns in at least one annulus formed by the multiple nested tubulars. In one or more embodiments of Example C, the one or more flow patterns indicate one or more leaks in at least one of the multiple nested tubulars.

The invention claimed is:

1. A method for leak detection comprising:
conveying an acoustic leak detection tool inside an innermost tubular of multiple nested tubulars, wherein the acoustic leak detection tool has one or more acoustic sensors;
taking measurements of the multiple nested tubulars at multiple measurement depths with the acoustic leak detection tool;
arranging the measurements into a response image; and
feeding the response image to a pre-trained deep neural network (DNN) to produce a flow likelihood image,
wherein the DNN comprises at least one convolutional layer, and
wherein the flow likelihood image comprises a representation of one or more flow patterns in at least one annulus formed by the multiple nested tubulars.

2. The method of claim 1, wherein the one or more acoustic sensors are hydrophones.

3. The method of claim 1, wherein the one or more acoustic sensors comprises one or more arrays of acoustic sensors.

4. The method of claim 3, wherein taking measurements of the multiple nested tubulars at the multiple measurement depths with the acoustic leak detection tool comprises measuring an acoustic signal with each of the sensors of the one or more arrays,
the method further comprising combining the measured acoustic signals from each of the sensor of the one or more arrays into fused measurements.

5. The method of claim 4, wherein the measured acoustic signals from each of the sensors are combined with a spatial filtering method or a beamforming method.

6. The method of claim 4, wherein the one or more arrays comprises multiple arrays,
wherein each of the fused measurements comprises
an acoustic amplitude at each measurement depth of the multiple measurement depths, or
a power spectral density versus frequency at each of the multiple measurement depths,
wherein the fused measurements for each array of the multiple arrays form a log,
wherein logs from the multiple arrays are juxtaposed to form the response image, and
wherein the response image comprises a two-dimensional (2D) representation of a tool response to one or more leakage paths in the multiple nested tubulars.

7. The method of claim 1, wherein taking measurements of the multiple nested tubulars at the multiple measurement depths with the acoustic leak detection tool comprises measuring an acoustic signal with each sensor of the one or more acoustic sensors.

8. The method of claim 7, wherein the one or more acoustic sensors comprises multiple acoustic sensors,
wherein each measurement comprises
an acoustic amplitude at each measurement depth of the multiple measurement depths, or
a power spectral density versus frequency at each of the multiple measurement depths,
wherein the measurements for each sensor of the multiple acoustic sensors form a log,
wherein logs from the multiple acoustic sensors are juxtaposed to form the response image, and
wherein the response image comprises a two-dimensional (2D) representation of a tool response to one or more leakage paths in the multiple nested tubulars.

9. The method of claim 1, wherein arranging the measurements into the response image comprises:

mapping each measurement at each depth to a log data point on a log for each of the one or more acoustic sensor or an array of acoustic sensors; and assigning a value to each pixel in the response image, wherein the value represents one of
a difference of an acoustic amplitude from a nominal acoustic amplitude value,
a normalized acoustic amplitude,
a difference of a power spectral density from a nominal power spectral density value, and
a normalized power spectral density.

10. The method of claim 1, wherein the one or more flow patterns indicate one or more leaks in at least one of the multiple nested tubulars.

11. The method of claim 1, wherein a value assigned to each pixel in the flow likelihood image is proportional to a percentage likelihood of flow in at least one annulus formed by the multiple nested tubulars.

12. The method of claim 1, wherein feeding the response image to the pre-trained DNN comprises splitting the response image into sections based on depth.

13. The method of claim 1, wherein the pre-trained DNN further comprises at least one of a concatenation layer, a summation layer, a max pooling layer, an up-sampling layer, and a dense layer.

14. The method of claim 1, further comprising training the DNN to provide the pre-trained DNN,
wherein training the DNN comprises building a database by using at least one of measurements of known cases and simulation,
wherein the database includes a plurality of samples, and
wherein each sample of the plurality of samples comprises a true image of an actual flow map due to one or more leak in the multiple nested tubulars and a corresponding response image.

15. The method of claim 14, wherein training the DNN further comprises finding optimum network parameters to minimize a misfit between output images produced by the DNN and corresponding true images according to an error metric.

16. One or more non-transitory computer-readable media comprising program code for leak detection, the program code to:
initiate measurements of multiple nested tubulars at multiple measurement depths with an acoustic leak detection tool conveyed inside an innermost tubular of the multiple nested tubulars;
arrange the measurements into a response image; and
feed the response image to a pre-trained DNN to produce a flow likelihood image,
wherein the DNN comprises at least one convolutional layer, and
wherein the flow likelihood image comprises a representation of one or more flow patterns in at least one annulus formed by the multiple nested tubulars.

17. The computer-readable media of claim 16, wherein the one or more flow patterns indicate one or more leaks in at least one of the multiple nested tubulars.

18. The computer-readable media of claim 16, wherein a value assigned to each pixel in the flow likelihood image is proportional to a percentage likelihood of flow in at least one annulus formed by the multiple nested tubulars.

19. A system comprising:
an acoustic leak detection tool disposed inside an innermost tubular of multiple nested tubulars;
a pre-trained DNN comprising at least one convolutional layer;
a processor; and
a computer-readable medium having program code executable by the processor to:
initiate measurements of the multiple nested tubulars at multiple measurement depths with the acoustic leak detection tool conveyed inside the innermost tubular;
arrange the measurements into a response image; and
feed the response image to the pre-trained DNN to produce a flow likelihood image,
wherein the flow likelihood image comprises a representation of one or more flow patterns in at least one annulus formed by the multiple nested tubulars.

20. The system of claim 19, wherein the one or more flow patterns indicate one or more leaks in at least one of the multiple nested tubulars.

* * * * *